(12) United States Patent
Pinard et al.

(10) Patent No.: US 9,591,440 B2
(45) Date of Patent: Mar. 7, 2017

(54) SYSTEM FOR QUICKLY FINDING THE WHEREABOUTS OF FRIENDS

(71) Applicant: InitLive Inc., Ottawa (CA)

(72) Inventors: Deborah Pinard, Dunrobin (CA); Melissa Pinard, Dunrobin (CA); Liam Williams, Ottawa (CA)

(73) Assignee: INITLIVE INC., Ottawa (CA)

( * ) Notice: Subject to any disclaimer, the term of this patent is extended or adjusted under 35 U.S.C. 154(b) by 0 days.

(21) Appl. No.: 14/891,807

(22) PCT Filed: May 20, 2014

(86) PCT No.: PCT/CA2014/000442
§ 371 (c)(1),
(2) Date: Nov. 17, 2015

(87) PCT Pub. No.: WO2014/183208
PCT Pub. Date: Nov. 20, 2014

(65) Prior Publication Data
US 2016/0105768 A1    Apr. 14, 2016

Related U.S. Application Data

(60) Provisional application No. 61/849,834, filed on May 17, 2013.

(51) Int. Cl.
H04W 4/20 (2009.01)
H04W 4/02 (2009.01)
(Continued)

(52) U.S. Cl.
CPC .......... *H04W 4/02* (2013.01); *G06F 17/3087* (2013.01); *G06F 17/30241* (2013.01); *G06Q 10/101* (2013.01); *G06Q 50/01* (2013.01); *G09B 29/007* (2013.01); *G09B 29/10* (2013.01); *G09B 29/106* (2013.01); *H04L 67/18* (2013.01); *H04L 67/26* (2013.01); *H04W 4/023* (2013.01); *H04W 4/206* (2013.01); *H04W 4/12* (2013.01)

(58) Field of Classification Search
CPC ...................................................... H04W 4/02
USPC .......................................... 455/456.1–456.5
See application file for complete search history.

(56) References Cited

U.S. PATENT DOCUMENTS 8,930,438 B2 *  1/2015  Williamson ............ H04W 4/02
                                                      709/203
2011/0130958 A1 *  6/2011  Stahl .................... G01C 21/362
                                                      701/533

(Continued)

*Primary Examiner* — Michael T Vu
(74) *Attorney, Agent, or Firm* — The Law Office of Michael E. Kondoudis (57) ABSTRACT

A method and/or system is disclosed allowing a user to quickly and easily obtain information on the location of another user or group of users. Such location information, may for example, be provided for quickly finding the whereabouts of friends, volunteers, employees, event attendees, etc. The system is comprised of a user application and a user connection server which utilizes push notification services. Accordingly, embodiments allow a user to ask, for example with a single button press/user selection, for the location of other users. In response to the request, the user can, for example with a single button press/user selection, choose to respond to the user. The requesting user then sees the location of the other user.

10 Claims, 7 Drawing Sheets

(51) Int. Cl.
  *G09B 29/10* (2006.01)
  *G06Q 10/10* (2012.01)
  *G06Q 50/00* (2012.01)
  *G09B 29/00* (2006.01)
  *G06F 17/30* (2006.01)
  *H04L 29/08* (2006.01)
  *H04W 4/12* (2009.01)

(56) References Cited

U.S. PATENT DOCUMENTS

2011/0289172 A1* 11/2011 Marcellino ............. H04L 51/24
 709/206
2012/0173610 A1* 7/2012 Bleau ...................... H04L 67/26
 709/203

* cited by examiner

SYSTEM FOR QUICKLY FINDING THE WHEREABOUTS OF FRIENDS

CROSS-REFERENCE TO RELATED APPLICATIONS

This patent application claims the benefit of U.S. Provisional Patent Application 61/849,834 filed May 17, 2013 entitled "System for Quickly Finding the Whereabouts of Friends."

FIELD OF THE INVENTION

This invention relates to the field of data communications and more particularly to a system for finding the location and/or status of other individuals.

BACKGROUND OF THE INVENTION

There are a wide range of instances where a group of individuals are coordinated for an event. Examples of such events can include, but are not limited to, birthday parties, weddings, christenings, funerals, school trips, concerts, business meetings, conferences, charity events, and reunions. Today, in order to set up such events a range of options exist with respect to communication tools including, for example, Simple Messaging Service (SMS), telephone, social media such as Facebook™, messaging services such as Twitter™, email, and web based services such as Google Events.

In the majority of instances these events are based at a particular location (e.g. an office, church, restaurant, concert hall, etc.) although in other instances these may be a range of locations (e.g. a charity run requiring volunteers at the start, finish and runner registration). When one or more of those invited or expected at a location does not appear then others must text, email, or call, trying to find out where they are. However, in many instances the missing individual(s) are currently travelling to that particular location and may, for example when driving, not be able to receive or reply to a telephone call, text, or email. At the same time they may not be familiar with the particular location, the neighbourhood or area around the particular location, etc. and hence actually find it difficult even when they are able to reply to provide an estimate of their arrival time or time to arrival.

Within the prior art there are smartphone applications that allow a user to track their friends. These include:

Trackster is an Apple iOS and Google Android smartphone Global Positioning System (GPS) based application. It allows a user to track, find and follow their friends who have also downloaded the application. It provides this information on a map. It also allows a user to tweet their location, choose who can track them, and allow them to text their friends.

Loopt is a smartphone application supporting iOS, Blackberry 10 and OS operating systems, Android, and Windows mobile platforms. Similar to Trackster the Loopt application allows a user to see where their friends are who have also downloaded the application and what they are doing.

BrightKite is a location-based social networking tool allowing a user to post their location and track where people are. In addition, BrightKite offers unlimited group texting with multiple friends in various locations.

Yahoo Fire Eagle is a free application allowing a user to send receive updates, track their friends, and see what is going on.

Find My Friends allows a user to locate their friends and family from their Apple iOS devices such as iPhone, iPad, or iPod touch. It displays upon a map where the user's friends are relative to the user's location.

GPS Tracking Pro allows a user to track family and friends through real-time location tracking using an Android device.

Google Latitude allows a user to view their friends upon a map, control who sees their location, at what level of detail, and check in at places to let friends know the user is there.

However, in all of these prior art applications it is a requirement that the user and the individual have not only a prior association within one another but that the individual has authorised the application to disclose their location. In the majority of these prior art applications it is also a requirement that the user and the individual are using the same application. In the majority of instances where the user and individual are not family or close friends then the individual does not wish to have the user know their location. In other instances, such as the Toronto Waterfront Marathon where there is a small organizing team and approximately 3,000 volunteers then ensuring all the volunteers have downloaded the application of choice of the event is an overhead the event can ill afford and then tracking a small number of volunteers within this larger number a significant issue as these prior art applications are primarily intended for tracking a small number of user's. Scrolling a list of 3,000 volunteers to enable, for example, the 10 missing volunteers to be located would take a user a significant period of time. Partitioning the list between multiple users only succeeds in creating additional management overhead and communications issues within the event organizers.

Accordingly, it would be beneficial to provide individuals, enterprises, organizers, etc. with the ability to establish allocation of an individual or group of individuals rapidly, with low complexity and management overhead, and without requiring that the two parties exploit the same software application or establish a relationship akin to friends within these prior art applications.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to the field of data communications and more particularly to a system for finding the location and/or status of other individuals.

In accordance with an embodiment of the invention there is provided a method comprising:

sending a request for a location of a receiving user from first application in execution upon an electronic device associated with a requesting user to a user notification server containing the requesting user information and receiving user information;

retrieving at the user notification server a device type associated with the receiving user using the receiving user information and choosing an appropriate push notification service to use based on the device type;

sending the request for location to the selected push notification service;

receiving said request for location on the device associated of the receiving user;
displaying the request on the device associated with the receiving user along with data relating to the requesting user and a corresponding device action;
receiving from the receiving user a response to the device action;
determining in dependence of the user response to the device action whether to:
retrieve location data from the device;
send a response to the requesting user containing the location data and receiving user information via the user notification server;
determining at the user notification server whether a response to the requesting user from the receiving user was received, wherein upon a positive determination the user notification server:
retrieves the device type of the requesting user and chooses an appropriate push notification service to use based on the device type;
sends the receiving user response including location data to the selected push notification service;
receiving said receiving user response upon the electronic device associated with the requesting user;
displaying upon the electronic device associated with the requesting user receiving user location data.

In accordance with an embodiment of the invention there is provided a system comprising a plurality of software based modules in execution upon electronic devices comprising at least microprocessors, the plurality of modules comprising:
a module for sending a request for a location of a user from a first electronic device to a notification server containing the requesting user information and receiving user information on a second electronic device;
a module on the second electronic device for receiving said request;
a module on the second electronic device for retrieving a device type of a third electronic device using the receiving user information and choosing an appropriate push notification service to use based on the device type of the third electronic device;
a module for sending the request for location to the selected push notification service;
a module for receiving said request for location on the third electronic device;
a module for displaying the request on the third electronic device along with requesting user information and with a corresponding action to be performed by the receiving user;
determining upon the action whether:
a module for retrieving location data retrieves location data relating to the third electronic device;
a module for sending a response to the requesting user containing the location data and receiving user information sends the response to the second electronic device;
a module for receiving said response on the second electronic device;
a module second electronic device for retrieving the device type of the first electronic device and choosing an appropriate push notification service to use based on the device type of the first electronic device;
a module on the second electronic device for sending the response to the selected push notification service;
a module on the first electronic device for receiving said response; and
a module for displaying the receiving user's location data on the first electronic device.

In accordance with an embodiment of the invention there is provided a system comprising a plurality of software based modules in execution upon a first electronic device comprising at least a microprocessor, the plurality of modules comprising:
a module for sending a request for a location of a receiving user from a first electronic device to a notification server containing the requesting user information and receiving user information on a second electronic device;
a module on the first electronic device for receiving said a response from the receiving user;
a module for displaying the receiving user's location data on the first electronic device.

In accordance with an embodiment of the invention there is provided a system comprising a plurality of software based modules in execution upon a first electronic device comprising at least a microprocessor, the plurality of modules comprising;
a module for receiving a request for a location of a receiving user from a second electronic device containing the requesting user information and receiving user information;
a module on the first electronic device for retrieving a device type of a third electronic device using the receiving user information and choosing an appropriate push notification service to use based on the device type of the third electronic device;
a module for sending the request for location to the selected push notification service;
a module for receiving a response from the third electronic device sent in response to the request;
a module on the first electronic device for retrieving the device type of the second electronic device and choosing an appropriate push notification service to use based on the device type of the second electronic device;
a module on the first electronic device for sending the response to the selected push notification service.

In accordance with an embodiment of the invention there is provided a system comprising a plurality of software based modules in execution upon a first electronic device comprising at least a microprocessor, the plurality of modules comprising:
a module for receiving said request for location on the first electronic device;
a module for displaying the request on the first electronic device along with requesting user information and with a corresponding action to be performed by the receiving user;
determining upon the action whether:
a module for retrieving location data retrieves location data relating to the first electronic device; and
a module for sending a response to the requesting user containing the location data and receiving user information sends the response to a second electronic device.

In accordance with an embodiment of the invention there is provided a method of establishing a location of user by another user comprising using push notification services to send a request to the user and receive a response from the user without requiring the user and another user to have any predetermined relationship except that the another user has an electronic address of the user.

In accordance with an embodiment of the invention there is provided a method of changing the destination of a user associated with an event, the method comprising:

establishing a location of the user in response to a request for the location of the user initiated by another user using push notification services to send the request to the user and receive the response from the user without the user and another user having any predetermined relationship except that the another user has an electronic address of the user;

establishing an estimated travel time of the user from the established location and a target location of the user;

determining in dependence upon at least the estimated travel time whether to provide the user with an alternate destination; and providing the alternate destination to the user via a push notification service where the determination is positive.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts a network environment within which embodiments of the invention may be employed;

FIG. 2 depicts a wireless portable electronic device supporting communications to a network such as depicted in FIG. 1 and as supporting embodiments of the invention;

DETAILED DESCRIPTION

The present invention is directed to the field of field of data communications and more particularly to a system for finding the location and/or status of other individuals.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals which includes, but is not limited to, private individuals, employees of organizations and/or enterprises, members of community organizations, members of charity organizations, men, women, children, and teenagers. In its broadest sense the user may further include, but not be limited to, software systems, mechanical systems, vehicle systems, physical assets, robotic systems, android systems, etc. that may be characterised by mobility and location such their location may be an aspect of them which is desired to be known at a particular instant.

An "event" as used herein may refer to, but is not limited to, a planned public or social occasion, happening, proceeding, incident, affair, function, gathering, "bash", competition, contest, tournament, round, fixture, race, conference, meeting, and appointment.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

The system(s) and/or application(s) described below in respect of embodiments of the invention may be employed in a standalone manner or they may, alternatively, be a feature of or be used as part of a larger system for creating, managing, running and/or coordinating an event. Within the embodiments of the invention described below these are described with respect to "friend connections" (FCs). However, it would be understood by one of skill in the art that this may be generalised to the context of "user connections" wherein no formal relationship exists between the two users other than they are associated with at least a single event.

Figure 1:
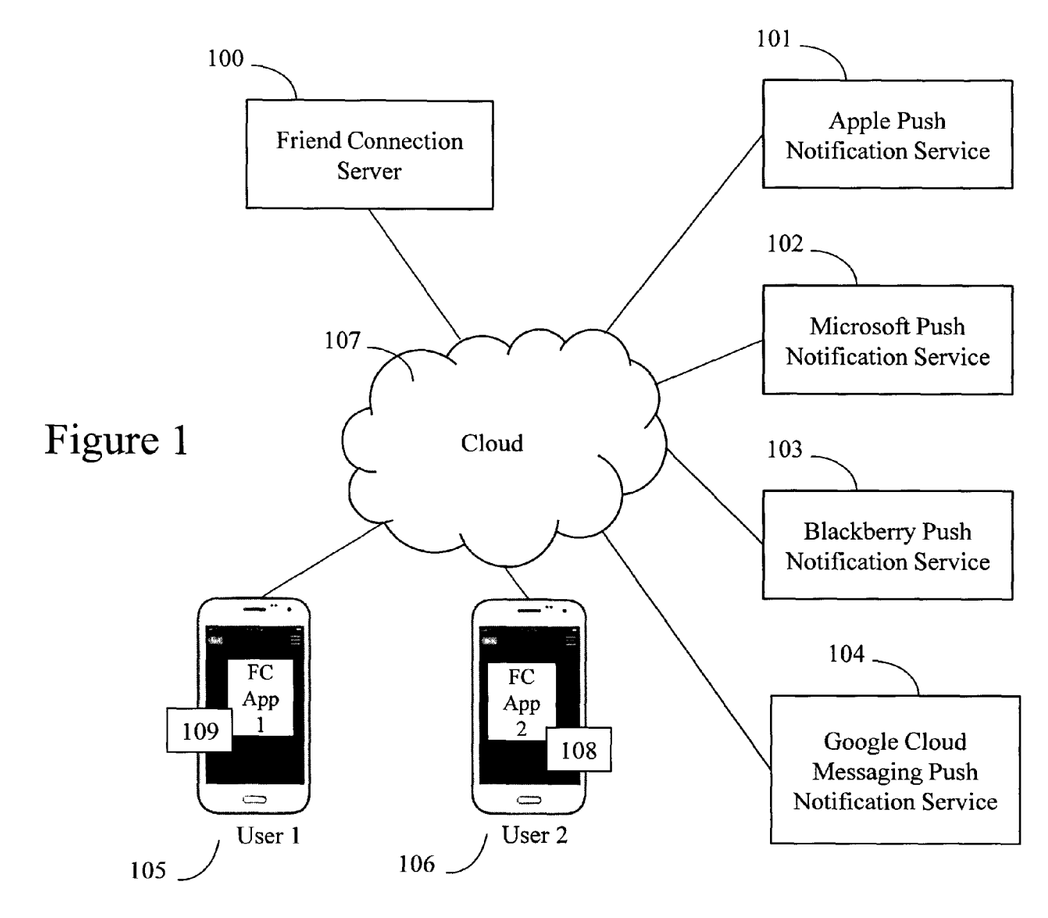
FIG. 1 shows the architecture of the system.

Referring to FIG. 1 there is depicted an example of an architecture for implementing a system according to embodiments of the invention. Accordingly, there is a FC server 100 which is connected to the cloud 107, i.e. the Internet, which is responsible for communications between all the Friend Connection Applications (FCAPs) 108, 109.

FCAPs 108,109 can reside on PEDs and/or FEDs. To do this the FC server 100 communicates with various platforms, for example Apple™ push notification service 101 when communicating with Apple™ PEDs and/or FEDs, a Microsoft push notification service 102 when communicating with Microsoft PEDs and/or FEDs, Google cloud messaging 104 when communicating with Android PEDs and/or FEDs, and a Blackberry push notification service 103 when communicating with Blackberry PEDs and/or FEDs. All of these push notification services 101, 102, 103, 104 are standard and exist today. There are specific Representational State Transfer (REST) application programming interface (API) endpoints for the push notification service of each of these platforms. Users 105, 106 have an FCAP 109,108 downloaded onto their devices. The FCAPs 109, 108 interact with the device's display and location services. Within an embodiment of the invention there is a different variant of the FCAP 109, 108 for each of the different types of device: Apple, Android, Blackberry and Microsoft. Each device type provides a standard API to retrieve location data. Whilst the push notification services are described as communicating with PEDs and/or FEDs it is generally expected that embodiments of the invention will be exploited primarily with PEDs although they may be exploited with FEDs.

Figure 2:
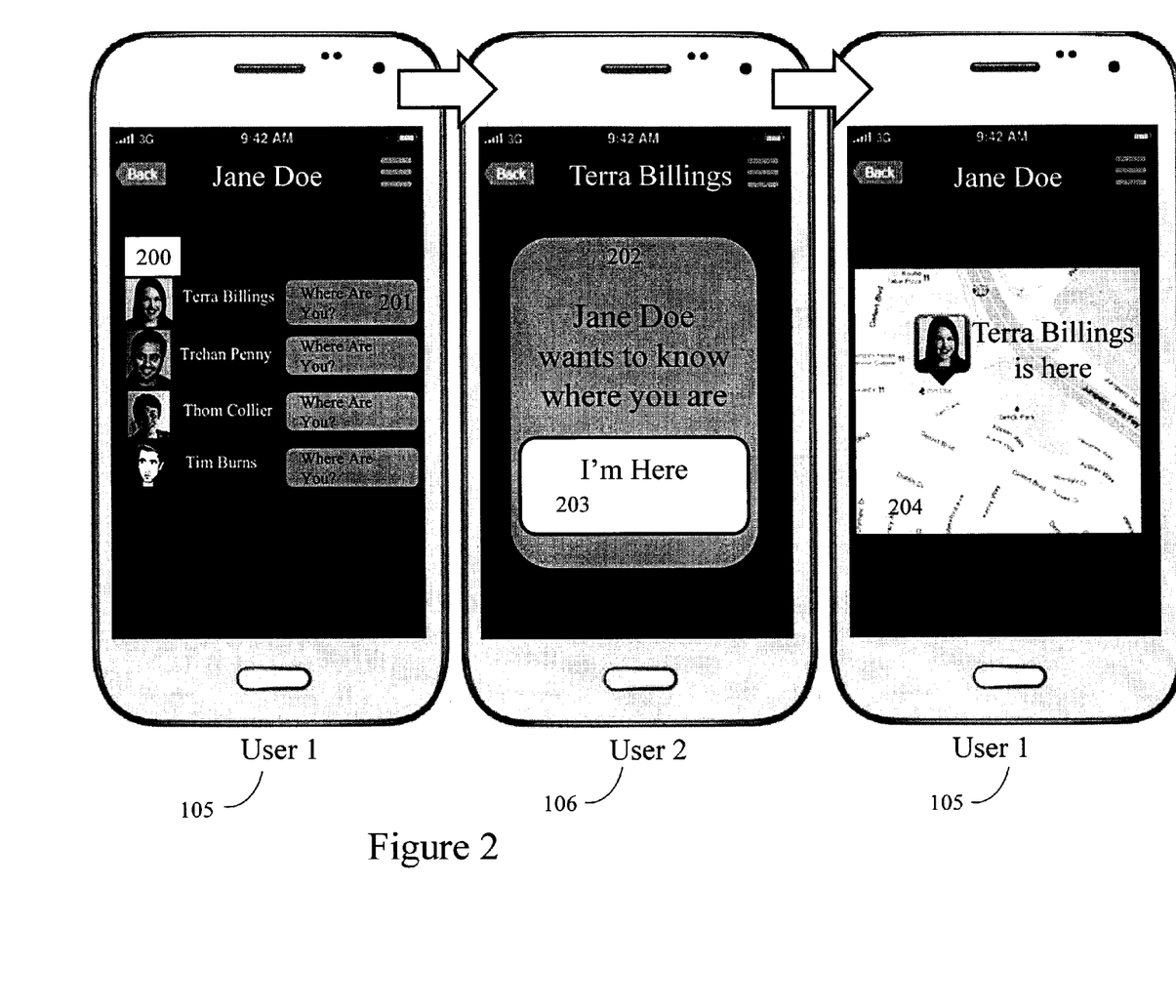
FIG. 2 shows an example of a user interface for the system on a smartphone.

Now referring to FIG. 2 there is depicted an exemplary user interface for the FCAPs within a system according to an embodiment of the invention. User 1 105 has a list of friends that they are currently interested in. This may be, for example, a complete list of all the user's friends, or it may alternatively be a list derived from a pre-setup event or outing. In this example User 1 105 (Jane Doe) wishes to find the whereabouts of Terra Billings 200, e.g. User 2 106. They tap the "Where Are You?" button 201 next to Terra Billings 200. This triggers a push notification to be sent to User 2 106 (Terra Billings 200) device and a notification 202 to appear upon their device. The notification 202 includes the name of the person (Jane Doe) that wishes to know where User 2 106 (Terra Billings) is. All User 2 106 (Terra Billings) has to then do is to tap the "I'm Here" button 203 on the device. This causes the location of User 2 106 (Terra Billings) to be sent back to User 1 105 (Jane Doe), and when it is received it pops up a map 204 showing the location of user 2 106 (Terra Billings). Neither of users 1 or 2 105,106 has to type anything, or make a call. They just have to tap a button once. Further, user 1 and user 2 do not need to have any formal association. It is merely sufficient that user 1 has contact details relating to user 2 which may, for example, have been provided by user 2 to user 1 or to an enterprise associated with user 1. For example, a volunteer registering to an event may provide their email address allowing them to not only receive communications in respect of the event but also for them to receive such communications through their FCAP.

Figure 3:
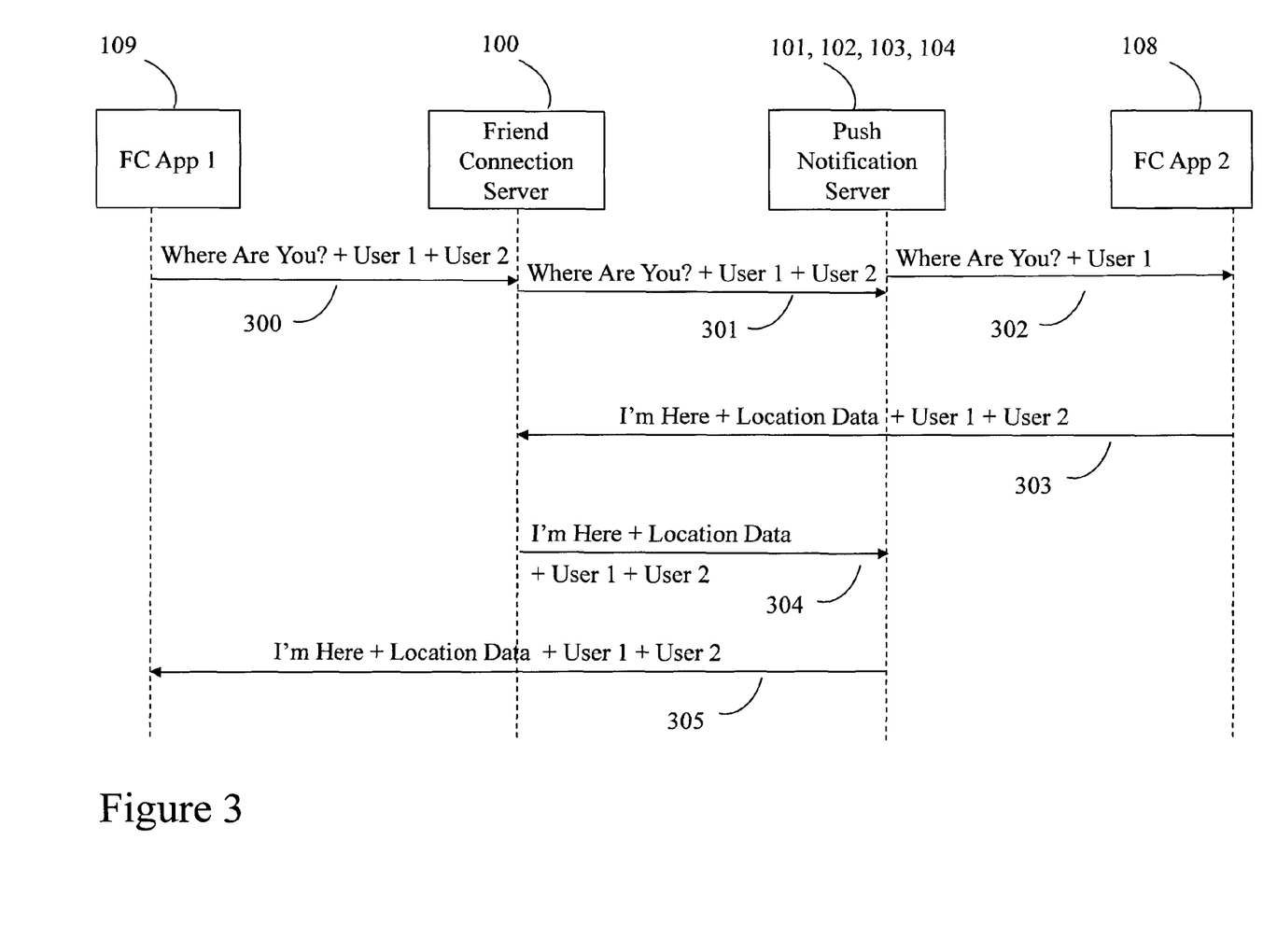
FIG. 3 is a message sequence chart for the system.

Referring to FIG. 3 there is depicted a message sequence chart according to an embodiment of the invention of the messages that go between the FCAP 1 109, the FC server 100, the push notification services 101, 102, 103,104 and the FCAP 2 108. FCAP 1 109 sends a "Where Are You'?" message 300 which includes the identity of User 1 105 and User 2 106 to the FC server 100. The FC server 100 then looks up the type of device that User 2 106 has and chooses the appropriate push notification service 101, 102, 103 or 104. It then sends the message 301 to the push notification service 101, 102, 103, 104 with the recipient being user 2's 106 device. The push notification service 101, 102, 103, 104 then sends the notification 302 onto the User 2 106 device. When the User 2 106 presses the "I'm Here" button, which is received by FCAP 2 108, FCAP 2 108 causes a message to be sent 303 to the FC server 100, which includes the identity of User 1 105 and User 2 106 and the location data of User 2 106 device. The FC server 100 then looks up the type of device that User 1 105 has and chooses the appropriate push notification service 101, 102, 103 or 104. It then sends the message 304 to the push notification service 101, 102, 103, 104 with the recipient being user 1's 105 device. The push notification service 101, 102, 103, 104 then sends the notification 305 on to the user 1 106 device. The FCAP 1 109 sees this notification and pops up a map showing the location of User 2 106.

Figure 4:
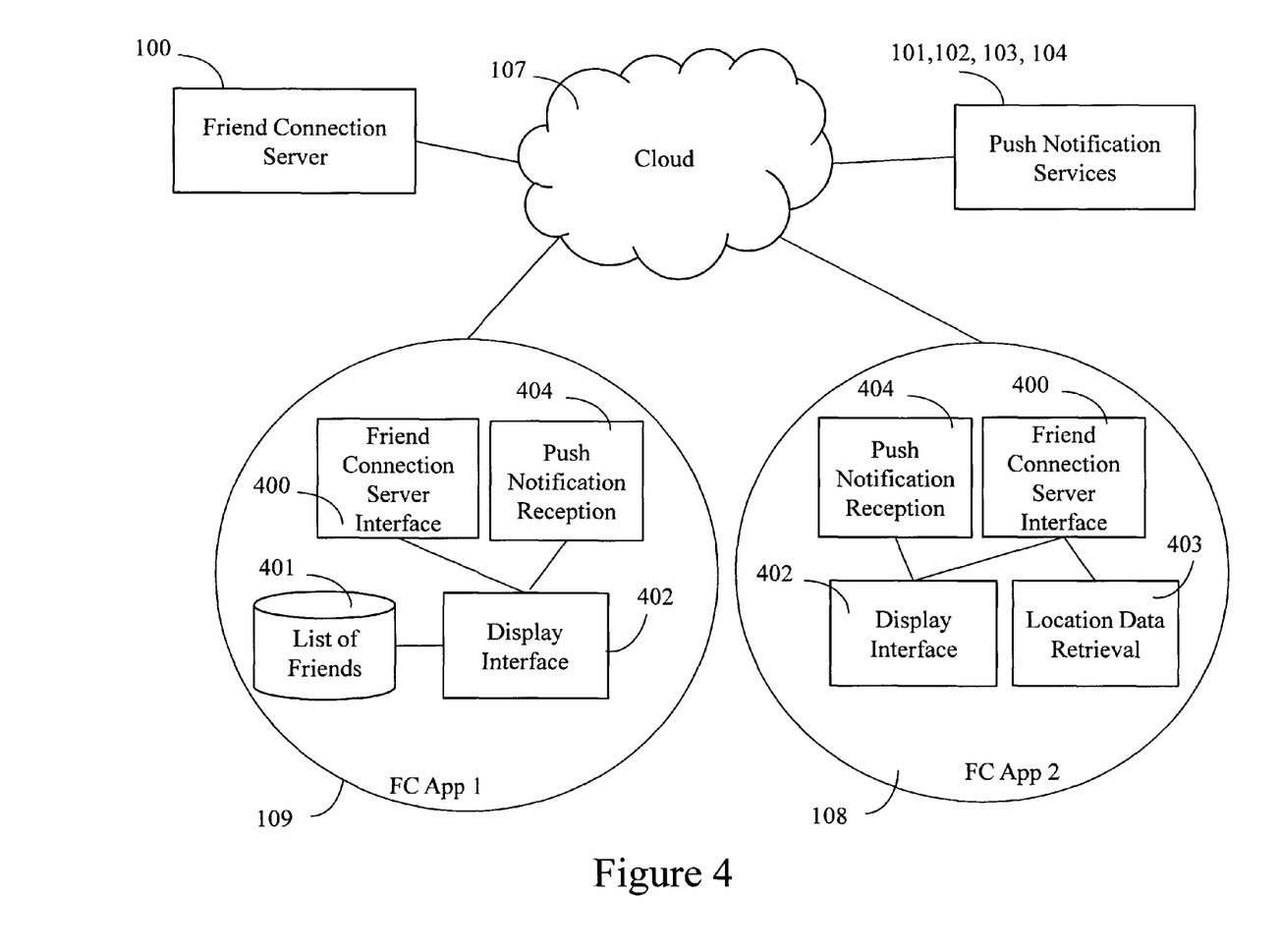
FIG. 4 shows details of the smartphone application.

Now referring to FIG. 4 there are depicted details of FCAP 1 109 and FCAP 2 108 according to an embodiment of the invention wherein both have FC server interfaces 400. This software is responsible for sending messages to the FC server 100 via the cloud 107. They also have push notification reception 404 software which is responsible for handling the receipt of push notifications from push notification services 101, 102, 103, and 104. The display interfaces 402 with each of FCAP 1 109 and FCAP 2 108 are responsible for displaying the correct images on the device. The list of friends 401 is data that the display interface 402 uses to display the list of friends to the user in selecting the user 109 to whom to send the request. Location data retrieval 403 software is responsible for retrieving location data from the device, such as for example by accessing GPS data with the device, accessing triangulation data of wireless transmitters associated with a wireless receiver of the device, an identity of a wireless node to which the device is connected and an identity or identities of one or more wireless beacons observable by a receiver or receivers of the device. Optionally, optical and/or other non-wireless sources of location information may be accessed. Optionally, location data may be derived from an ad-hoc network to which the device is connected rather than a fixed or installed network. Each device typically has an API that is freely accessible to do this.

Figure 5:
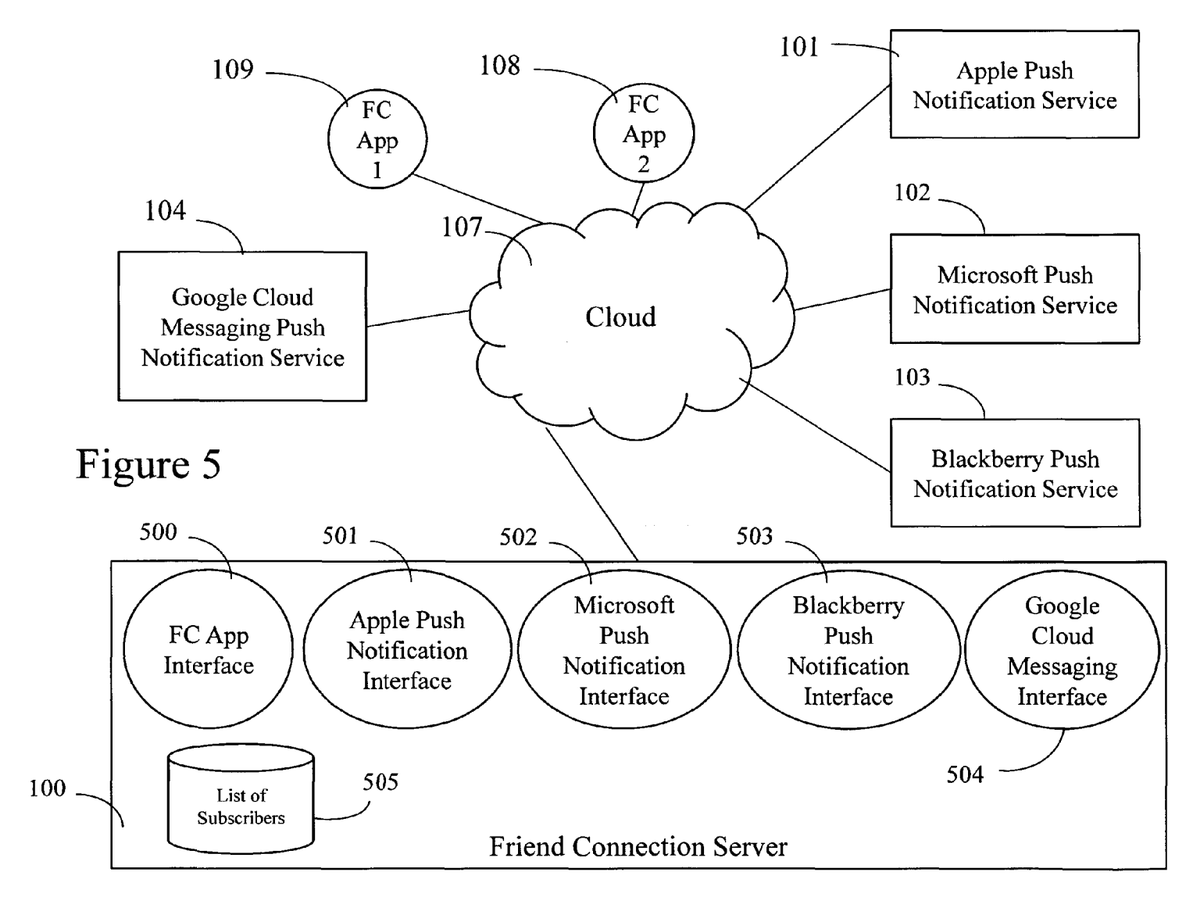
FIG. 5 shows the details of the FC server.

Now referring to FIG. 5 there are depicted details of an FC server 100 according to an embodiment of the invention. FCAP interface 500 is software that receives messages from all the FCAPs 109, 108 via the cloud 107. It exploits reference to a list of subscribers 505 wherein this data is used to verify the sender's identity and to look up the type of device that they have. It receives two types of messages, "Where Are You?" and "I'm Here" coming from FCAPs 108, 109. It looks up the device type of the user 105,106 the message is being pushed to, which then lets it select the correct push notification interface 501, 502, 503, 504 to use to send the "Where Are You?" message to the recipient and the device type of the sender to send the "I'm Here" message in response. The push notification interfaces 501, 502, 503, 504 interface with the corresponding push notification services 101, 102, 103, 104.

Figure 6:
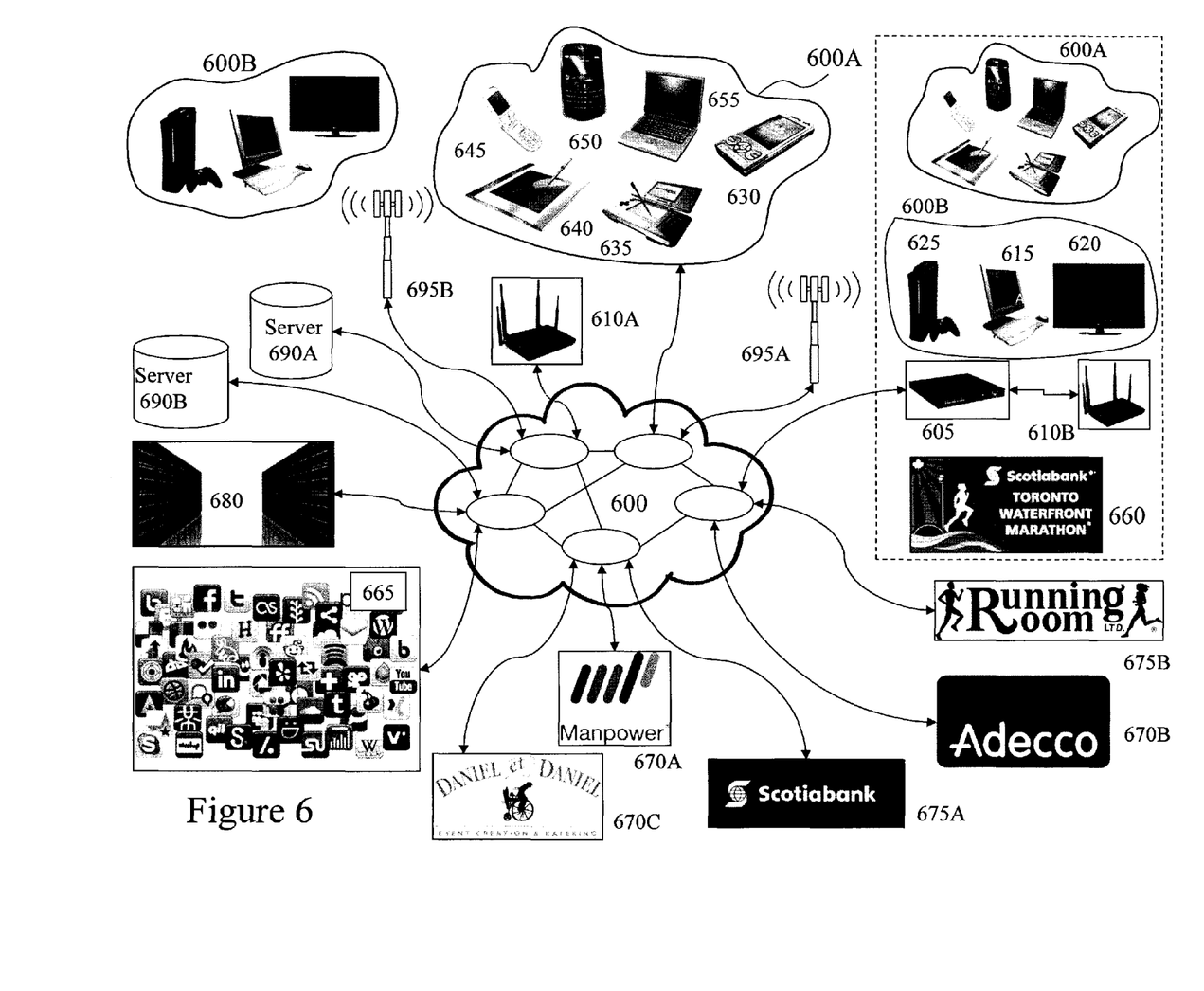
FIG. 6 depicts a network environment within which embodiments of the invention may be employed.

Now referring to FIG. 6 there is depicted a network environment 600 within which embodiments of the invention may be employed supporting friend connection systems and friend connection applications/platforms (FCS-FCAPs) according to embodiments of the invention. Such FCA-FCAPs, for example supporting multiple device types, multiple communication channels, fixed content, dynamic content, etc. As shown first and second user groups 600A and 600B respectively interface to a telecommunications network 600. Within the representative telecommunication architecture a remote central exchange 680 communicates with the remainder of a telecommunication service providers network via the network 600 which may include for example long-haul OC-48/OC-192 backbone elements, an OC-48 wide area network (WAN), a Passive Optical Network, and a Wireless Link. The central exchange 680 is connected via the network 600 to local, regional, and international exchanges (not shown for clarity) and therein through network 600 to first and second cellular APs 695A and 695B respectively which provide Wi-Fi cells for first and second user groups 600A and 600B respectively. Also connected to the network 600 are first and second Wi-Fi nodes 610A and 610B, the latter of which being coupled to network 600 via router 605. Second Wi-Fi node 610B is associated with Enterprise 660, e.g. Toronto Waterfront Marathon™, within which other first and second user groups 600A and 600B exist. Second user group 600B may also be connected to the network 600 via wired interfaces including, but not limited to, DSL, Dial-Up, DOCSIS, Ethernet, G.hn, ISDN, MoCA, PON, and Power line communication (PLC) which may or may not be routed through a router such as router 605.

Within the cell associated with first AP 610A the first group of users 600A may employ a variety of PEDs including for example, laptop computer 655, portable gaming console 635, tablet computer 640, smartphone 650, cellular telephone 645 as well as portable multimedia player 630. Within the cell associated with second AP 610B are the second group of users 600B which may employ a variety of FEDs including for example gaming console 625, personal computer 615 and wireless/Internet enabled television 620 as well as cable modem 605. First and second cellular APs 695A and 695B respectively provide, for example, cellular GSM (Global System for Mobile Communications) telephony services as well as 3G and 4G evolved services with enhanced data transport support. Second cellular AP 695B provides coverage in the exemplary embodiment to first and second user groups 600A and 600B. Alternatively the first and second user groups 600A and 600B may be geographically disparate and access the network 600 through multiple APs, not shown for clarity, distributed geographically by the network operator or operators. First cellular AP 695A as show provides coverage to first user group 600A and environment 670, which comprises second user group 600B as well as first user group 600A. Accordingly, the first and second user groups 600A and 600B may according to their particular communications interfaces communicate to the network 600 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 600A may form associations either through standards such as IEEE 802.15 and Bluetooth as well in an ad-hoc manner.

Also connected to the network 600 are Social Networks (SOCNETS) 665, first and second personnel providers 670A and 670B respectively, e.g. Manpower™ and Adecco™, catering service provider 670C, e.g. Daniel & Daniel (Toronto, Canada), and first to second partner enterprises 675A and 675B respectively, e.g. Scotiabank™ and Running Room™, as well as first and second servers 690A and 690B which together with others, not shown for clarity. First and second servers 690A and 690B may host according to embodiments of the inventions multiple services associated with a provider of FCA-FCAPs; a provider of a SOCNET or Social Media (SOME) exploiting FCA-FCAP features; a provider of a SOCNET and/or SOME not exploiting FCA-FCAP features; a provider of services to PEDS and/or FEDS; a provider of one or more aspects of wired and/or wireless communications; an Enterprise 660 exploiting FCA-FCAP features; license databases; content databases; event databases; registration databases; customer databases; contact databases; websites; and software applications for download to or access by FEDs and/or PEDs exploiting and/or hosting FCA-FCAP features. First and second primary content servers 690A and 690B may also host for example other Internet services such as a search engine, financial services, third party applications and other Internet based services.

Accordingly, an enterprise user or individual user (ENUINU) may exploit a PED and/or FED within an Enterprise 660, for example, and access one of the first or second primary content servers 690A and 690B respectively to perform an operation such as accessing/downloading an application which provides FCA-FCAP features according to embodiments of the invention; execute an application already installed providing FCA-FCAP features; execute a web based application providing FCA-FCAP features; or exploit FCA-FCAP features within another application. Similarly, an ENUINU may undertake such actions or others exploiting embodiments of the invention exploiting a PED or FED within first and second user groups 600A and 600B respectively via one of first and second cellular APs 695A and 695B respectively and first Wi-Fi nodes 610A.

Figure 7:
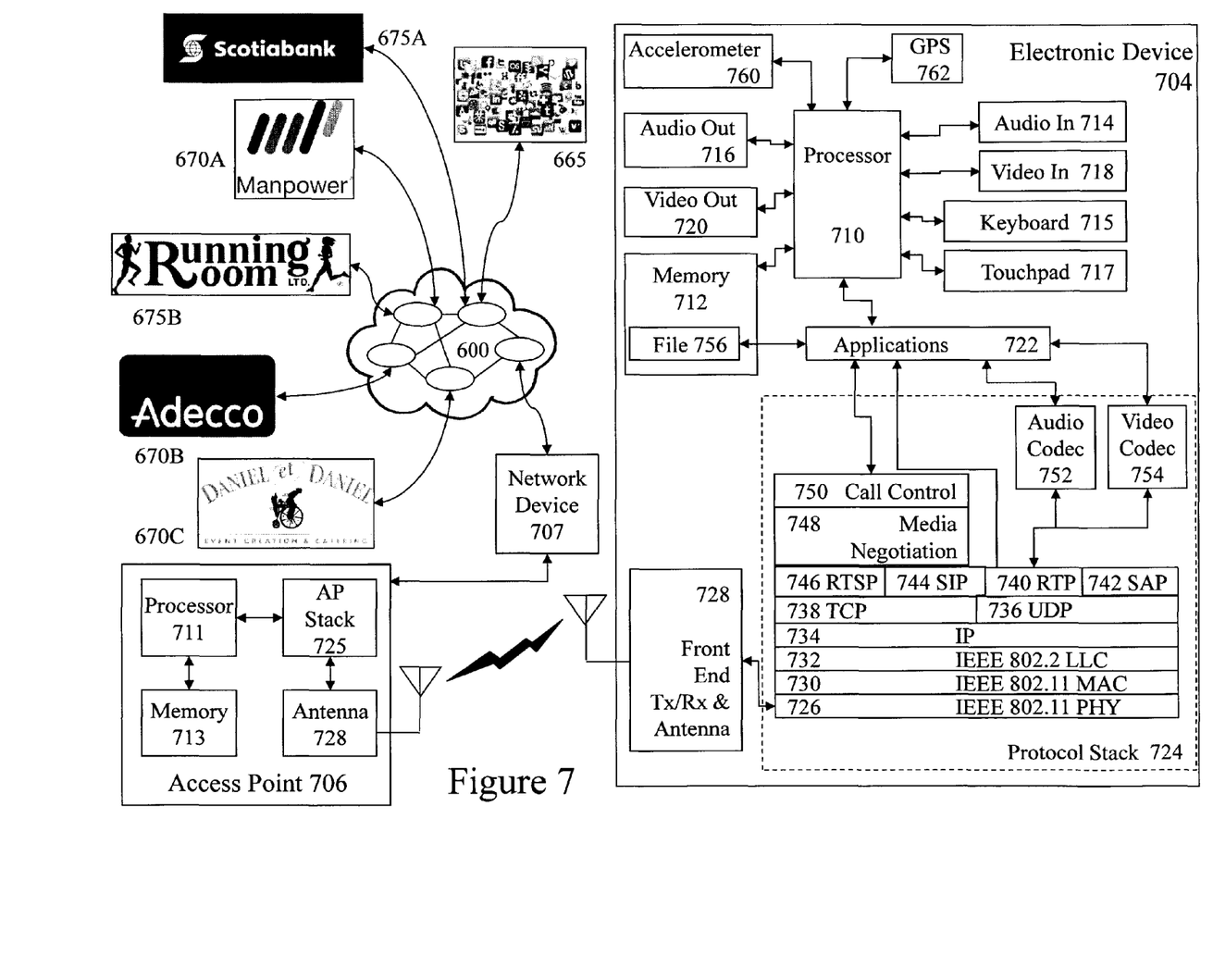
FIG. 7 depicts a wireless portable electronic device supporting communications to a network such as depicted in FIG. 6 and as supporting embodiments of the invention.

Now referring to FIG. 7 there is depicted an electronic device 704 and network access point 707 supporting FCA-FCAP features according to embodiments of the invention. Electronic device 704 may, for example, be a PED and/or FED and may include additional elements above and beyond those described and depicted. Also depicted within the electronic device 704 is the protocol architecture as part of a simplified functional diagram of a system 700 that includes an electronic device 704, such as a smartphone 655, an access point (AP) 706, such as first AP 610, and one or more network devices 707, such as communication servers, streaming media servers, and routers for example such as first and second servers 690A and 690B respectively. Network devices 707 may be coupled to AP 706 via any combination of networks, wired, wireless and/or optical communication links such as discussed above in respect of FIG. 6 as well as directly as indicated. Network devices 707 are coupled to network 600 and therein Social Networks (SOCNETS) 665, first and second personnel providers 670A and 670B respectively, e.g. Manpower™ and Adecco™, catering service provider 670C, e.g. Daniel & Daniel (Toronto, Canada), and first to second partner enterprises 675A and 675B respectively, e.g. Scotiabank™ and Running Room™.

The electronic device 704 includes one or more processors 710 and a memory 712 coupled to processor(s) 710. AP 706 also includes one or more processors 711 and a memory 713 coupled to processor(s) 710. A non-exhaustive list of examples for any of processors 710 and 711 includes a central processing unit (CPU), a digital signal processor (DSP), a reduced instruction set computer (RISC), a complex instruction set computer (CISC) and the like. Furthermore, any of processors 710 and 711 may be part of application specific integrated circuits (ASICs) or may be a part of application specific standard products (ASSPs). A non-exhaustive list of examples for memories 712 and 713 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 704 may include an audio input element 714, for example a microphone, and an audio output element 716, for example, a speaker, coupled to any of processors 710. Electronic device 704 may include a video input element 718, for example, a video camera or camera, and a video output element 720, for example an LCD display, coupled to any of processors 710. Electronic device 704 also includes a keyboard 715 and touchpad 717 which may for example be a physical keyboard and touchpad allowing the user to enter content or select functions within one of more applications 722. Alternatively the keyboard 715 and touchpad 717 may be predetermined regions of a touch sensitive element forming part of the display within the electronic device 704. The one or more applications 722 that are typically stored in memory 712 and are executable by any combination of processors 710. Electronic device 704 also includes accelerometer 760 providing three-dimensional motion input to the process 710 and GPS 762 which provides geographical location information to processor 710.

Electronic device 704 includes a protocol stack 724 and AP 706 includes a communication stack 725. Within system 700 protocol stack 724 is shown as IEEE 802.11 protocol stack but alternatively may exploit other protocol stacks such as an Internet Engineering Task Force (IETF) multimedia protocol stack for example. Likewise AP stack 725 exploits a protocol stack but is not expanded for clarity. Elements of protocol stack 724 and AP stack 725 may be implemented in any combination of software, firmware and/or hardware. Protocol stack 724 includes an IEEE 802.11-compatible PHY module 726 that is coupled to one or more Front-End Tx/Rx & Antenna 728, an IEEE 802.11-compatible MAC module 730 coupled to an IEEE 802.2-compatible LLC module 732. Protocol stack 724 includes a network layer IP module 734, a transport layer User Datagram Protocol (UDP) module 736 and a transport layer Transmission Control Protocol (TCP) module 738.

Protocol stack 724 also includes a session layer Real Time Transport Protocol (RTP) module 740, a Session Announcement Protocol (SAP) module 742, a Session Initiation Protocol (SIP) module 744 and a Real Time Streaming Protocol (RTSP) module 746. Protocol stack 724 includes a presentation layer media negotiation module 748, a call control module 750, one or more audio codecs 752 and one or more video codecs 754. Applications 722 may be able to create maintain and/or terminate communication sessions with any of devices 707 by way of AP 706. Typically, applications 722 may activate any of the SAP, SIP, RTSP, media negotiation and call control modules for that purpose. Typically, information may propagate from the SAP, SIP, RTSP, media negotiation and call control modules to PHY module 726 through TCP module 738, IP module 734, LLC module 732 and MAC module 730.

It would be apparent to one skilled in the art that elements of the electronic device 704 may also be implemented within the AP 706 including but not limited to one or more elements of the protocol stack 724, including for example an IEEE 802.11-compatible PHY module, an IEEE 802.11-compatible MAC module, and an IEEE 802.2-compatible LLC module 732. The AP 706 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP)

module and a Real Time Streaming Protocol (RTSP) module, media negotiation module, and a call control module. Portable and fixed electronic devices represented by electronic device 704 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

In accordance with an embodiment of the invention a method and/or system is provided allowing a user to quickly and easily request and receive data relating to the whereabouts of other users. The system sends a request for location of a user from a PED and/or FED to a user notification server containing the requesting user information and receiving user information. The user notification server receives the request, retrieves the device type using the receiving user information and chooses the appropriate push notification service to use based on the device type. The user notification server then sends the request for location to the selected push notification service. This request for location information is then received by the receiving user's PED and/or FED application, which displays the request along with the requesting user information and a corresponding action. Upon execution of the action, the user's device retrieves location data, and sends a response intended for the requesting user containing the location data and receiving user information to the user notification server. The user notification server then receives the response and retrieves the device type of the requesting user and chooses the appropriate push notification service to user. The user notification server then sends the response to the selected push notification service wherein it then received by the requesting user through the appropriate PED and/or FED application. The response is then received by the appropriate PED and/or FED application which then displays to the requesting user the receiving user's location data.

According to an embodiment of the invention the receiving user's location data is displayed on a map to the requesting user. Within another embodiment of the invention the receiving user's location is presented on a map in association with a location of an event involving the receiving user allowing the receiving user to make a judgment with respect to the receiving user's time of arrival at the event. Within another embodiment of the invention the receiving user's location is presented on a map in association with a location associated with the requesting user allowing the requesting user to send a modified event request to the receiving user that allows the event to occur earlier and/or closer to the originally intended start time.

Within another embodiment of the invention the map displayed to the requesting user is parsed from a map provider/map service including information from one or more third party service providers (which may be the same enterprise as the map provider/map service.) In this instance the requesting user is presented with additional information such as local traffic, for example, allowing the requesting user to make a more accurate judgment. Within another embodiment of the invention the receiving user may be presented with a map wherein the receiving user location data has been parsed by a map provider/map service together with the location of an event associated with the receiving user and third party information such that the user is presented with distance/time information based upon archived data and/or real time conditions. Accordingly, the receiving user may be provided with additional data by the requesting user such as an alternate route or alternate destination. For example, rather than having a volunteer arrive late at a destination where their help may be not needed by the time they arrive, e.g. all the runners have left, then they may be directed to a new destination, e.g. finish line, hydration station, changeover point, etc. so that they are able to contribute to the event. In other embodiments of the invention the alternate destination is determined by the application in dependence upon current user location and the location(s) established within the application for the event to which the user is currently associated with.

Within the embodiments of the invention described supra the requesting user request is described as being communicated via a push notification server. Within embodiments of the invention the push notification server is selected based upon knowledge of the user's device alone or it is selected in dependence upon the user's device in combination with the communication service determined in dependence upon the receiving user's address associated by the requesting user with the request. Accordingly, a phone number may cause use of a SMS service, an email use of an email application, a twitter handle use of Twitter™, a Facebook™ user name a post to the receiving user's Facebook™ wall, etc. In some embodiments of the invention an application that is discrete from other receiving user software applications may be employed whilst in other embodiments of the invention the application may be triggered from within another software application based upon the receiving user performing the action. In some instances the push notification server and the notification service features may require that the message include a URL which when accessed runs code on the receiving user's PED and/or FED to retrieve the location information and send this back for transmission to the requesting user.

Within other embodiments of the invention the receiving user may be able to add additional information rather than simply providing their location. Said information may, for example, be a limited text response, e.g. 140 characters, such that the additional information may be posted to a social media website/application within a profile associated with the event to which the receiving user is invited and their whereabouts sought. Within another embodiment of the invention the action performed by the receiving user triggers downloading of an application to their PED and/or FED wherein the application extracts the location data and transmits this.

In another implementation the sending of a request for location of a user is initiated from a list of users established in association with an event. This list may be generated by an organizer of the event or it may be created by user's registering for an event, e.g. volunteers to an event, users accepting a meeting request, etc. Within other embodiments of the invention such a list or lists may be part of an application for creating and running an event. Optionally, the list may be the contacts of a user on their PED and/or FED or within an application, e.g. email. In other embodiments of the invention the list may be associated with a directory, e.g. an enterprise staff directory. Within another embodiment of the invention the user address may be established through the selection of a member of a SOCNET and/or SOME wherein their information is provided confidentially to the requesting user rather than to all friends/contacts of the receiving user and/or requesting user. In another embodiment of the invention the receiving and requesting users may, for example, be members of a community, e.g. a dating service.

Within other embodiments of the invention the action of the receiving user may be audibly activated allowing them to perform the action or deny the action through an audio command, e.g. saying YES or NO, etc. In this manner a hands free operation for providing a response may be provided to users who are currently driving, engaged in an activity, etc.

Whilst embodiments of the invention have been described with respect to the organization of an event it would be evident to one skilled in the art that the embodiments of the invention may also be employed within other settings such as, for example, a mother seeking to find the current location of their daughter, son, husband, father, etc. without monitoring them continuously.

Accordingly, embodiments allow a user to ask, for example with a single button press/user selection, for the location of other users. In response to the request, the user can, for example with a single button press/user selection, choose to respond to the user. The requesting user then sees the location of the other user.

Within another embodiment of the invention the PEDs and/or FEDs of a group of users, e.g. the organizer(s) and invitee(s) of an event, may have an application in execution wherein each of the user's devices knows the IP address of all or a subset of the devices associated with the other users. Accordingly, the communications may be performed peer-to-peer with no server in the middle for data direction. Within such an embodiment each device should acquire the other IP addresses, which may for example be through an initial service running on a server that they connect with when the event is being established and they are being invited. In the context of an event, when the devices running an application according to an embodiment of the invention then they may initially connect to acquire event information then they would also receive the IP addresses of all the other devices currently associated with the event which would be connected to the user list. Subsequently, upon another connection of the user's device to the event server then the IP address list updated or alternatively a list of IP addresses may be sent to their IP address with event association information allowing the application to add these IP addresses in respect of the event Then when a "Where are you?" request is sent to a user then it may be sent directly from the requester device to the IP address of the receiving user's device, and the application would handle the display and response actions on both sides. Accordingly, a temporary closed messaging system between devices based on their IP addresses would be established where the temporary closed messaging system is associated with an event and location information is only provided in response to a specific request that the recipient approves in a discrete process. In the case(s) where IP addresses are changing then a server may be employed as a relay point, with the devices keeping it updated with their IP addresses. Embodiments of the invention of such a configuration would bypass the requirement for a specific push notification service to be available for each device type. As such the embodiments of the invention in this manner would means the application provides its own "push notification service" which would be independent of any device type(s).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method relating to a location of a user comprising:
   sending a request for a location of a receiving user from a first application in execution upon an electronic device associated with a requesting user to a user notification server containing the requesting user information and receiving user information;
   retrieving at the user notification server a device type associated with the receiving user using the receiving user information and choosing an appropriate push notification service to use based on the device type;
   sending the request for location to the selected push notification service;
   receiving said request for location on the device associated of the receiving user;
   displaying the request on the device associated with the receiving user along with data relating to the requesting user and a corresponding device action;
   receiving from the receiving user a response to the device action;
   determining in dependence of the user response to the device action whether to:
   retrieve location data from the device;
   send a response to the requesting user containing the location data and receiving user information via the user notification server;
   determining at the user notification server whether a response to the requesting user from the receiving user was received, wherein upon a positive determination the user notification server:
   retrieves the device type of the requesting user and chooses an appropriate push notification service to use based on the device type;
   sends the receiving user response including location data to the selected push notification service;
   receiving said receiving user response upon the electronic device associated with the requesting user;
   displaying upon the electronic device associated with the requesting user receiving user location data, wherein the receiving user and requesting user have no association other than that they are both members of a group of users associated with an event whose contact data is stored within a database accessible by the user notification server.

2. The method according to 1, wherein the receiving user's location data is displayed on a map.

3. The method according to 1, wherein said list of contacts forms part of a database generated by an application for at least one of creating, managing, and running an event.

4. A system comprising a plurality of software based modules in execution upon electronic devices comprising at least microprocessors, the plurality of modules comprising:
   a module for sending a request for a location of a user from a first electronic device to a notification server containing the requesting user information and receiving user information on a second electronic device;
   a module on the second electronic device for receiving said request;
   a module on the second electronic device for retrieving a device type of a third electronic device using the receiving user information and choosing an appropriate push notification service to use based on the device type of the third electronic device;
a module for sending the request for location to the selected push notification service;
a module for receiving said request for location on the third electronic device;
a module for displaying the request on the third electronic device along with requesting user information and with a corresponding action to be performed by the receiving user;
determining upon the action whether:
   a module for retrieving location data retrieves location data relating to the third electronic device;
   a module for sending a response to the requesting user containing the location data and receiving user information sends the response to the second electronic device;
a module for receiving said response on the second electronic device;
a module second electronic device for retrieving the device type of the first electronic device and choosing an appropriate push notification service to use based on the device type of the first electronic device;
a module on the second electronic device for sending the response to the selected push notification service;
a module on the first electronic device for receiving said response; and
a module for displaying the receiving user's location data on the first electronic device, wherein
the receiving user and requesting user have no association other than that they are both members of a group of users associated with an event whose contact data is stored within a database accessible by the second electronic device.

5. The method according to 4, wherein the receiving user's location data is displayed on a map.

6. The method according to 4, wherein sending a request for location of the receiving user is initiated by the selection of the receiving user from a list of contacts.

7. The method according to 6, wherein said list of contacts forms part of a database generated by an application for at least one of creating, managing, and running an event.

8. The method according to claim 4, wherein the receiving user's location data is displayed on a map in association with data relating to the event and data extracted from a service provider indicating at least an approximate travel time to the event from the location identified by the location data.

9. The method according to 4, wherein the push notification service is at least one of proprietary to a particular device type, is proprietary to a plurality of device types, is non-proprietary, is open source based, and provides messaging via at least one of a cloud network and the Internet.

10. A system comprising a plurality of software based modules in execution upon a first electronic device comprising at least a microprocessor, the plurality of modules comprising:
in a first configuration:
   a module for sending a request for a location of a receiving user from the first electronic device to a notification server containing the requesting user information and receiving user information on a second electronic device;
   a module on the first electronic device for receiving said a response from the receiving user;
   a module for displaying the receiving user's location data on the first electronic device, wherein
   the receiving user and requesting user have no association other than that they are both members of a group of users associated with an event whose contact data is stored within a database accessible by the second electronic device;
in a second configuration:
   a module for receiving a request for a location of a receiving user from a second electronic device containing the requesting user information and receiving user information;
   a module on the first electronic device for retrieving a device type of a third electronic device using the receiving user information and choosing an appropriate push notification service to use based on the device type of the third electronic device;
   a module for sending the request for location to the selected push notification service;
   a module for receiving a response from the third electronic device sent in response to the request;
   a module on the first electronic device for retrieving the device type of the second electronic device and choosing an appropriate push notification service to use based on the device type of the second electronic device;
   a module on the first electronic device for sending the response to the selected push notification service, wherein
   the receiving user and user have no association other than that they are both members of a group of users associated with an event whose contact data is stored within a database accessible by the second electronic device;
in a third configuration:
   a module for receiving said request for location on the first electronic device;
   a module for displaying the request on the first electronic device along with requesting user information and with a corresponding action to be performed by the receiving user;
determining upon the action whether:
a module for retrieving location data retrieves location data relating to the first electronic device; and
a module for sending a response to the requesting user containing the location data and receiving user information sends the response to a second electronic device, wherein
the receiving user and user have no association other than that they are both members of a group of users associated with an event whose contact data is stored within a database accessible by the second electronic device.

* * * * *